United States Patent [19]

Farrow

[11] Patent Number: 4,733,045
[45] Date of Patent: Mar. 22, 1988

[54] METHOD OF AND STRUCTURE FOR HIGH SPEED RESISTANCE SEAM WELDING

[75] Inventor: John F. Farrow, Plymouth, Mich.
[73] Assignee: Medar, Inc., Farmington Hills, Mich.
[21] Appl. No.: 938,975
[22] Filed: Dec. 8, 1986
[51] Int. Cl.[4] .............................................. B23K 11/24
[52] U.S. Cl. .................................... 219/108; 219/116; 219/117.1
[58] Field of Search ....................... 219/64, 81, 82, 83, 219/108, 114, 116, 117.1

[56] References Cited

U.S. PATENT DOCUMENTS

| | | | |
|---|---|---|---|
| 2,179,284 | 11/1939 | Diamond | 219/81 |
| 2,329,122 | 9/1943 | Leathers et al. | 219/114 |
| 2,776,401 | 1/1957 | Sommeria | 219/114 |

Primary Examiner—Clifford C. Shaw
Attorney, Agent, or Firm—Dale R. Small

[57] ABSTRACT

A method of and structure for high speed seam welding. The method comprises placing an auxiliary transformer between a three phase source of electrical welding energy and seam welder structure, which auxiliary transformer includes three separate primary windings connected to the separate phases of the source of welding energy, phase controlling the energizing of each separate primary winding and energizing the seam welder from the auxiliary transformer. In one embodiment, the phases of the auxiliary transformer are energized in the order of the phase of the welding energy and a delay of approximately 120° of the welding energy is provided between the energizing of each auxiliary transformer winding. In another embodiment of the invention, the auxiliary transformer primary windings are energized in a first, third, second, welding energy phase order with a delay of 240° of the welding energy between energizing each primary coil winding to provide a substantially 60/40, on/off auxiliary transformer energizing. The structure of the invention may include an auxiliary transformer secondary winding connected to the primary winding of a seam welder welding current transformer or a seam welder welding current transformer having a primary winding connected in parallel with one of the three primary windings of the auxiliary transformer or an auxiliary transformer including a secondary winding connected directly to the seam welder structure.

26 Claims, 5 Drawing Figures

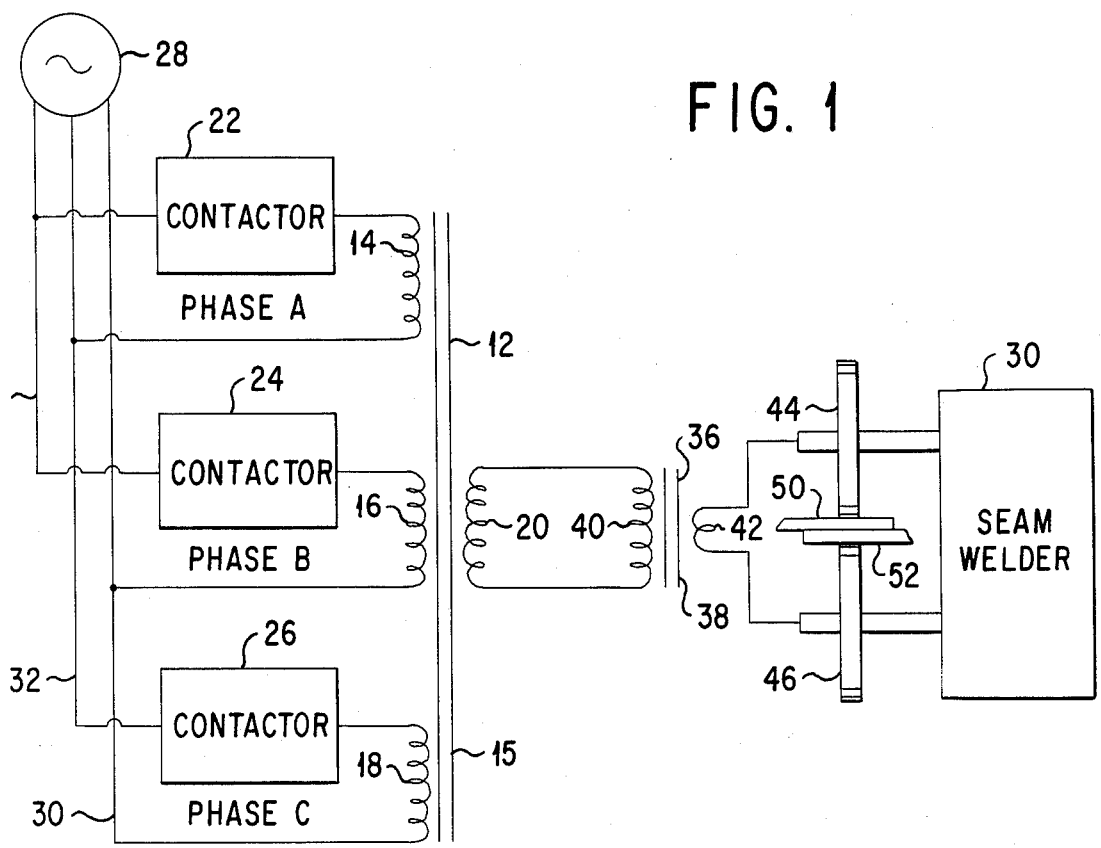
FIG. 1
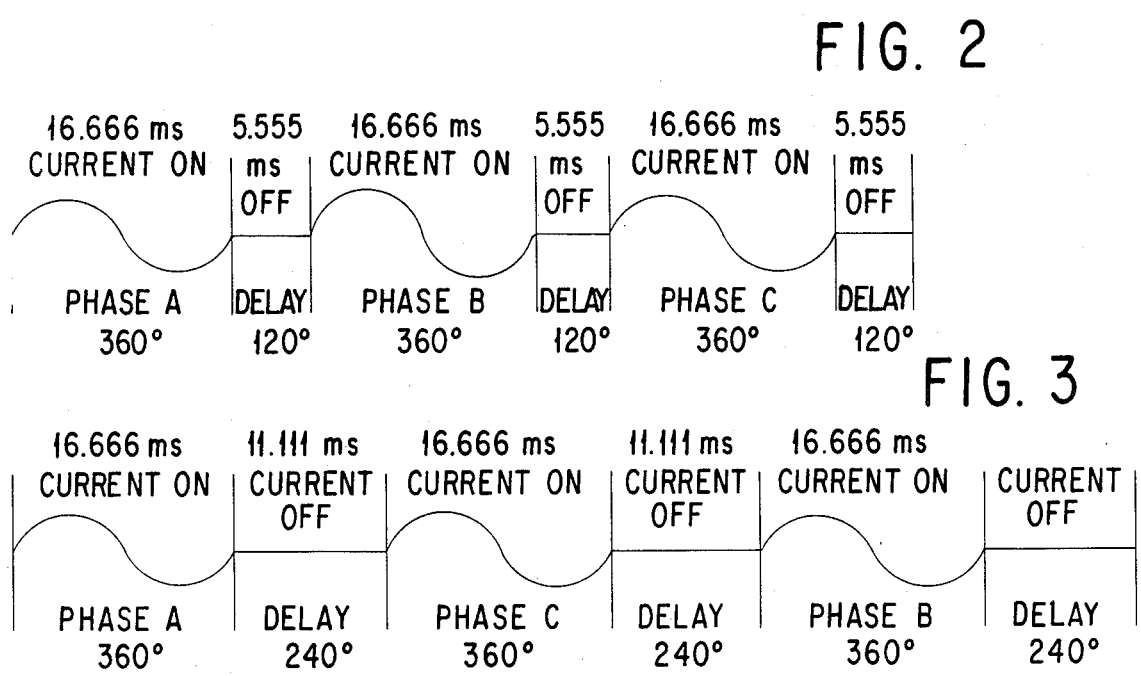
FIG. 2
FIG. 3

METHOD OF AND STRUCTURE FOR HIGH SPEED RESISTANCE SEAM WELDING

BACKGROUND OF THE INVENTION

1. Field of the Invention

The invention relates to welding and refers more specifically to high speed seam welding wherein two or more sheets of metal are joined by a long, continuous, welded seam. The usual purpose of such a weld is to form a leak tight joint between two pieces of metal so that, for example, a fuel tank can be made from two hemispherical pieces of sheet metal welded together along their edges.

2. Description of the Prior Art

Structure used to do resistance seam welding often includes two copper wheels, on opposite sides of metal work pieces to be welded, which are rolled over the work pieces as welding current is applied to heat the metal. Pressure is applied to the wheels to push the heated metal together and form a welded seam. Such action is similar to that involved in making a resistance spot weld except that the wheels turn continuously as the weld is being made.

A commonly used method to improve seam weld quality is to pulse the weld current. In other words, the current used to heat the metal is not applied continuously, but rather it is applied in an on/off pattern. The effect of such current pulsation is to create a series of individual spot welds which overlap to produce a continuous, leak tight seam.

Virtually all larger seam welders use 60 hertz power lines for their power source. Welding current is controlled using primary circuit, phase control, just like with resistance spot welders.

When very fast seam welding speeds are attempted, i.e. speeds of 300 inches per minute and faster, the welding current needs to be pulsed at a rate which is not some integral, multiple of 60 hertz which is the usual power line frequency. Furthermore, for most seam welding applications, the optimum ratio of current on-time to current off-time is on the order of 60% on and 40% off.

Since most large seam welders operate from 60 hertz single phase power lines, such requirements are very hard to meet using conventional techniques. Usually welding speeds must be slowed in order to make good welds with such prior methods and structure.

SUMMARY OF THE INVENTION

In accordance with the method and structure of the invention, an auxiliary transformer is connected between the same welder and a three phase welding energy power line which transformer includes a separate primary winding connected across each phase of the three phase welding energy source and the welding energy through the separate primary windings is phase controlled to provide optimum welding energy through the auxiliary transformer to the high speed resistance seam welder.

In one modification of the method of the invention, the phase control of the welding energy passed through the primary windings of the auxiliary transformer produces alternative energizing of the three primary windings of the auxiliary transformer in the order of the phases of the welding energy with the energizing of the separate primary windings of the auxiliary transformer being delayed from each other by approximately 120° of a cycle of the source of welding energy.

In another modification of the invention, the primary windings of the auxiliary transformer are energized separately for a full cycle of a phase of the source of welding energy in the order of first, third and second phases of the source of electrical energy with a delay between energizing each primary winding of approximately 240° of a cycle of the source of welding energy to provide an optimum 60/40, on/off ratio of the welding energy.

The structure of the invention may further include a seam welder welding current transformer including a primary winding connected to a secondary winding of the auxiliary transformer which seam welder transformer has a secondary winding connected to welding wheels of the seam welder structure.

Alternatively, the primary winding of a seam welder, welding current transformer may be connected directly across one of the auxiliary transformer primary windings and the secondary winding of the seam welder transformer may again be connected to the welding wheels of the seam welder structure.

In a third modification of the structure of the invention, the seam welder welding current transformer may be redesigned to provide the three separate primary windings. Or put another way, the secondary winding of the auxiliary transformer having the three separate primary windings may be connected directly to the welding wheels of seam welder structure.

BRIEF DESCRIPTION OF THE DRAWINGS

FIG. 1 is a schematic drawing of high speed, resistance seam welder structure constructed in accordance with the invention for practicing the method of the invention.

FIG. 2 is a wave form diagram useful in describing the method of the invention as practiced with the structure of FIGS. 1, 4 or 5.

FIG. 3 is another wave form diagram similar to that of FIG. 2 showing alternate phase control effected in accordance with the method of the invention on practice of the invention utilizing the structure of FIGS. 1, 4 or 5.

DESCRIPTION OF THE PREFERRED EMBODIMENT

Figure 4:
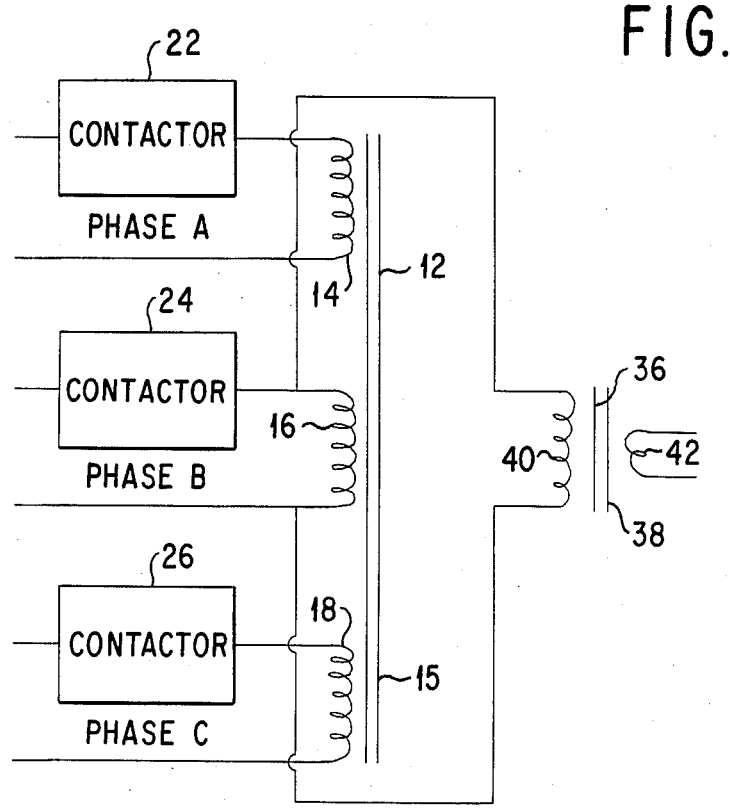
FIG. 4 is a modification of the high speed, resistance, seam welder structure of FIG. 1.

As shown best in FIG. 1, the structure 10 of the invention includes an auxiliary transformer 12 including three separate primary windings 14, 16, and 18, and a secondary winding 20. The structure 10 of the invention further includes separate contactors 22, 24 and 26 in series with the auxiliary transformer primary windings 14, 16 and 18 for phase control of energy passed through the primary windings 14, 16 and 18 respectively. In accordance with the invention, the auxiliary transformer 12 and the contactors 22, 24 and 26 are connected between the source of three phase electrical welding energy 28 and the seam welder structure 30.

The three phase source of electrical energy 28 feeds three conductors 30, 32 and 34 having a separate phase of a three phase, 60 cycle, source of energy across each pair.

The seam welder welding current transformer 36, shown in FIG. 1 includes a core 38 and primary and secondary windings 40 and 42 respectively. The primary winding 40 of the seam welder transformer 36 is connected across the secondary winding 20 of the auxiliary transformer 12 as shown. The secondary winding 42 of the seam welder transformer is connected between the wheels 44 and 46 of the seam welder structure 30, also as shown in FIG. 1.

In operation of the structure shown in FIG. 1, in accordance with the method of the invention, with particular reference to FIG. 2, when it is desired to effect a seam weld between the work pieces 50 and 52 electrical welding energy is passed to the wheels 44 and 46 through the auxiliary transformer 12 and the seam welder welding current transformer 36. The wheels 44 and 46 are rotated at a desired speed and pressure is applied therebetween in the usual manner.

With the primary windings 14, 16 and 18 of the auxiliary transformer 12 connected to the three phase source of electrical enerby 28 as shown in FIG. 1, the contactor 22 is closed at the start of a cycle of a first phase, indicated Phase A in FIG. 2, of the three phase electrical welding energy. Contactor 22 is opened at the end of a single cycle of the first phase of the three phase electrical welding energy as shown in FIG. 2.

All of the contactors 22, 24 and 26 then remain open for approximately 120° of the three phase electrical energy, again as shown in FIG. 2, after which contactor 24 is closed at the start of a cycle of a second phase of the three phase electrical energy, indicated Phase B in FIG. 2, and remains closed for a complete cycle of the second phase of the three phase electrical energy.

Following opening of the contactor 24, all of the contactors 22, 24, and 26 again remain open for approximately 120° of the three phase electrical energy, again as shown in FIG. 2, after which contactor 26 is closed for a full cycle of the third phase of the three phase electrical welding energy, designated Phase C in FIG. 2.

After a delay of approximately 120° of the three phase electrical energy, the cycle of contactor opening and closing is repeated.

The sequence of phase A, phase B, phase C is repeated as long as welding current is desired. The resulting wave form delivered to the welding transformer looks substantially like the diagram in FIG. 2.

To control welding current conventional phase control methods are used with the three contactors.

The advantage of the wave form of FIG. 2 is that it comes closer to the desired 60% on, 40% off, ratio which has been experimentally determined to be desirable in continuous, high speed, resistance, seam welding.

As a modification of the method of the invention, and as particularly shown in FIG. 2, the delay between turn-on of the individual contactors 22, 24 and 26 may be increased to 240°. With such delay time increase, the phase sequence is phase A, phase C, and phase B, as shown in FIG. 3. That is to say, contactor 22 is first closed, followed by the closing of contactor 26 and the subsequent closing of contactor 24 with delays of 240° between contactor closings and openings. Again, this phase sequence is repeated for as long as welding current is desired.

The wave form of FIG. 3. 3 supplies exactly the 60/40, on/off ratio desired for high speed, resistance seam welding, but its current pulse repitition rate is only 36 hertz as opposed to the 45 hertz wave form of FIG. 2. The lower frequency can in some cases limit maximum welding speed.

As an alternative to the high speed resistance seam welding structure illustrated in FIG. 1, as shown in FIG. 4, the secondary winding 20 of the auxiliary transformer 12 may be eliminated and the primary winding 40 of the seam welding current transformer 36 may be connected directly across any of the primary windings 14, 16, and 18 of the auxiliary transformer 12. As shown in FIG. 4 the primary winding 40 of the seam welding current transformer 36 is connected directly across the primary winding 16 of the auxiliary transformer 12.

Figure 5:
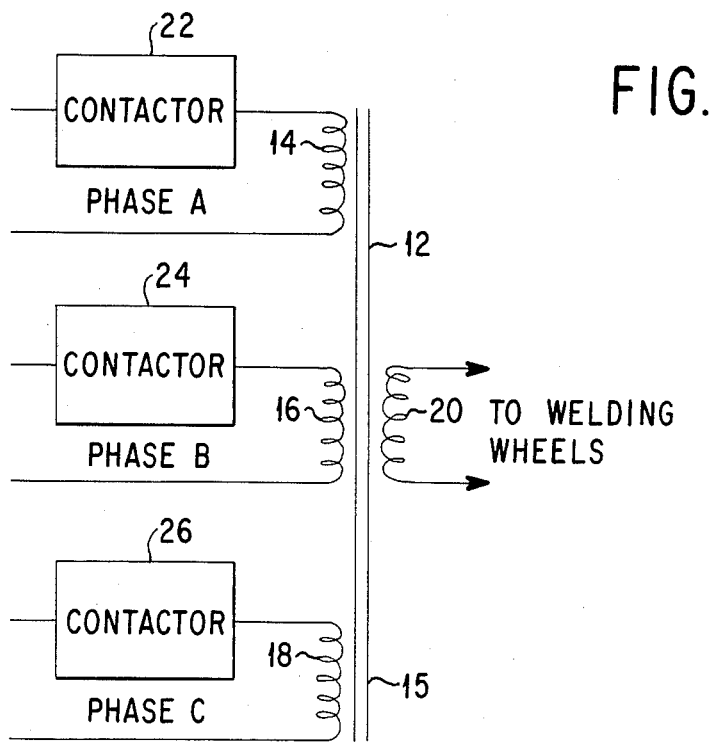
FIG. 5 is another modification of the high speed, resistance, seam welder structure of FIG. 1.

In a further modification of the high speed resistance seam welding structure shown in FIG. 1, and as shown in FIG. 5, the secondary winding 20 of the auxiliary transformer 12 may be connected directly to the welding wheels 44 and 46 of the high speed, resistance, seam welding structure 30. Or, said in other language, the seam welder, welding current, transformer 36 can be modified to include three separate primary windings, such as windings 14, 16, and 18, and contactors 22, 24, and 26.

While one embodiment of the present invention has been considered in detail along with modifications of both the structure and method of the invention, it will be understood that other modifications and embodiments are contemplated. It is the intention to include all modifications and embodiments of the present invention as are defined by the appended claims within the scope of the invention.

What is claimed is:

1. A method of high speed resistance welding comprising connecting an auxiliary transformer having three primary windings between a three phase source of electrical welding energy and high speed resistance seam welding structure and phase controlling the welding energy provided to the primary windings of the auxiliary transformer from the three phase source of welding energy including energizing each phase primary winding at a different time and with only one phase of the primary winding being energized at any time.

2. The method as set forth in claim 1 wherein phase controlling of the welding energy provided to the primary windings of the auxiliary transformer comprises energizing a first phase primary winding for a first predetermined time, delaying energizing the second phase primary winding for a first period of time after the first predetermined time, energizing the second phase primary winding after the first period of time for a second predetermined time, delaying energizing the third phase primary winding for a second period of time after the second predetermined time, subsequently energizing the third phase primary winding for a third predetermined time and delaying energizing the first phase primary winding again for a third period of time after said third predetermined time.

3. The method as set forth in claim 2 wherein each predetermined time is a full cycle of the respective welding energy phase.

4. The method as set forth in claim 2 wherein each period of time is 120° of a cycle of the welding energy.

5. The method as set forth in claim 1 wherein phase controlling of the welding energy provided to the primary windings of the auxiliary transformer comprises energizing a first phase primary winding for a first predetermined time, delaying energizing of the third phase primary winding for a first period of time after the first predetermined time, energizing the third phase primary winding after the first period of time for a second predetermined time, delaying energizing the second phase primary winding for a second period of time after the second predetermined time, and subsequently energizing the second phase primary winding for a third predetermined time after the second period of time and subsequently delaying again energizing the first phase primary winding for a third period of time after the third predetermined time.

6. The method as set forth in claim 5 wherein each predetermined time is a full cycle of the respective welding energy phase.

7. The method as set forth in claim 5 wherein each period of time is 240° of a cycle of the welding energy.

8. The method as set forth in claim 1 and further including providing the auxiliary transformer with a secondary winding and providing a seam welder welding current transformer having a primary and a secondary winding between the auxiliary transformer and the seam welder structure and connecting the primary winding of the seam welder transformer to the secondary winding of the auxiliary transformer and connecting the secondary winding of the seam welder transformer to the seam welder structure.

9. The method as set forth in claim 8 wherein phase controlling the welding energy comprises first energizing a first of the auxiliary transformer primary windings with a first phase of the winding energy for a full cycle of a first phase of the welding energy, delaying energizing the auxiliary transformer for approximately 120° of the welding energy, energizing a second of the auxiliary transformer primary windings with a second phase of the welding energy for a full cycle of a second phase of the welding energy, delaying energizing of the auxiliary transformer for approximately 120° of the welding energy, energizing the third primary winding of the auxiliary transformer with a third phase of the welding energy for a full cycle of the third phase of the welding energy and delaying energizing of the auxiliary transformer again for approximately 120° of the welding energy.

10. The method as set forth in claim 8 wherein phase controlling the welding energy comprises first energizing a first primary winding of the auxiliary transformer with a first phase of the welding energy for a full cycle of the first phase of the of welding energy, delaying energizing the auxiliary transformer for approximately 240° of the welding energy, energizing a third primary winding of the auxiliary transformer with a third phase of the welding energy for a full cycle of the third phase of the welding energy, delaying energizing of the auxiliary transformer for approximately 240° of the welding energy, energizing the second primary winding of the auxiliary transformer with the second phase of the welding energy for a full cycle of the second phase of the welding energy and delaying energizing of the auxiliary transformer again for approximately 240° of the welding energy.

11. The method as set forth in claim 1 and further including providing the auxiliary transformer with a secondary winding and directly connecting the seam welder structure to the secondary winding of the auxiliary transformer.

12. The method as set forth in claim 11 wherein phase controlling the welding energy comprises first energizing a first of the auxiliary transformer primary windings with a first phase of the welding energy for a full cycle of a first phase of the welding energy, delaying energizing the auxiliary transformer for approximately 120° of the welding energy, energizing a second of the auxiliary transformer primary windings with a second phase of the welding energy for a full cycle of a second phase of the welding energy, delaying energizing of the auxiliary transformer for approximately 120° of the welding energy, energizing the third primary winding of the auxiliary transformer with a third phase of the welding energy for a full cycle of the third phase of the welding energy and delaying energizing of the auxiliary transformer again for approximately 120° of the welding energy.

13. The method as set forth in claim 11 wherein phase controlling the welding energy comprises first energizing a first primary winding of the auxiliary transformer with a first phase of the welding energy for a full cycle of the first phase of the of welding energy, delaying energizing the auxiliary transformer for approximately 240° of the welding energy, energizing a third primary winding of the auxiliary transformer with a third phase of the welding energy for a full cycle of the third phase of the welding energy, delaying energizing of the auxiliary transformer for approximately 240° of the welding energy, energizing the second primary winding of the auxiliary transformer with the second phase of the welding energy for a full cycle of the second phase of the welding energy and delaying energizing of the auxiliary transformer again for approximately 240° of the welding energy.

14. The method set forth in claim 1 and further including the step of delaying energizing and transformer primary winding associated with each phase of the three phase source of electrical energy for a predetermined time after stopping energizing of another transformer primary winding associated with another phase of the three phase source of electrical energy.

15. The method as set forth in claim 14 wherein the predetermined time is equal to 120° of a single cycle of the three phase source of electrical welding energy.

16. The method as set forth in claim 14 wherein the predetermined time is equal to 240° of a single cycle of the three phase source of electrical welding energy.

17. The method as set forth in claim 14 wherein each phase primary winding is energized for a full cycle of the associated phase of the three phase electrical energy.

18. The method as set forth in claim 1 wherein each phase primary winding is energized for a full cycle of the associated phase of the three phase electrical energy.

19. A method of high speed resistance seam welding comprising connecting an auxiliary transformer having three primary windings to a three phase source of electrical welding energy, providing a seam welder welding current transformer having a primary winding and a secondary winding between the auxiliary transformer and high speed resistance seam welding structure, connecting the primary winding of the seam welder transformer in parallel with one of the auxiliary transformer primary windings and connecting the secondary winding of the seam welder transformer to the seam welder structure and phase controlling the welding energy provided to the primary winding of the auxiliary transformer from the three phase source of welding energy.

20. The method as set forth in claim 19 wherein phase controlling the welding energy comprises first energizing a first of the auxiliary transformer primary windings with a first phase of the welding energy for a full cycle of a first phase of the welding energy, delaying energizing the auxiliary transformer for approximately 120° of the welding energy, energizing a second of the auxiliary transformer primary windings with a second phase of the welding energy for a full cycle of a second phase of the welding energy, delaying energizing of the auxiliary transformer for approximately 120° of the welding energy, energizing the third primary winding of the auxiliary transformer with a third phase of the welding energy for a full cycle of the third phase of the welding energy and delaying energizing of the auxiliary transformer again for approximately 120° of the welding energy.

21. The method as set forth in claim 19 wherein phase controlling the welding energy comprises first energizing a first primary winding of the auxiliary transformer with a first phase of the welding energy for a full cycle of the first phase of the of welding energy, delaying energizing the auxiliary transformer for approximately 240° of the welding energy, energizing a third primary winding of the auxiliary transformer with a third phase of the welding energy for a full cycle of the third phase of the welding energy, delaying energizing of the auxiliary transformer for approximately 240° of the welding energy, energizing the second primary winding of the auxiliary transformer with the second phase of the welding energy for a full cycle of the second phase of the welding energy and delaying energizing of the auxiliary transformer again for approximately 240° of the welding energy.

22. Structure for energizing high speed resistance seam welding structure comprising an auxiliary transformer having three primary windings adapted to be connected to separate phases of three phase electrical welding energy, phase control structure in each auxiliary transformer primary winding and means for energizing the high speed resistance seam welder structure from the auxiliary transformer comprising a seam welder current transformer having a primary and secondary winding, means connecting the primary winding of the seam welder current transformer to one of the primary phase windings of the auxiliary transformer and means for connecting the secondary winding of the seam welder current transformer to the seam welder structure.

23. High speed resistance seam welding structure ecomprising a source of three phase electrical energy, an auxiliary transformer having three separate primary windings, means connecting each of the auxiliary transformer primary windings across a separate phase of the three phase source of electrical energy, a single auxiliary transformer secondary winding, a seam welder current transformer having a primary winding connected in parallel with the secondary winding of the auxiliary transformer and having a secondary winding connected directly to the seam welder structure and separate phase control means in each auxiliary transformer primary winding for controlling the energizing of the associated transformer primary winding from an associated phase of the three phase source of welding energy to energize each primary winding of the auxiliary transformer at a different time and with only one phase of the primary winding being energized at any time for a full cycle and providing a predetermined time delay between energizing of the separate auxiliary transformer primary windings for a time equal to one of 120° and 240° of a single cycle of the three phase source of electrical energy.

24. High speed resistance seam welding structure comprising a source of three phase electrical energy, an auxiliary transformer having three separate primary windings, means connecting each of the auxiliary transformer primary windings across a separate phase of the three phase source of electrical energy, a seam welder current transformer having a primary winding connected across one of the primary windings of the auxiliary transformer and having a second winding connected directly to the seam welder structure and separate phase control means in each auxiliary transformer primary winding for controlling the energizing of the associated transformer primary winding from an associated phase of the three phase source of welding energy to energize each primary winding of the auxiliary transformer at a different time and with only one phase of the primary winding being energized at any time for a full cycle and providing a predetermined time delay between energizing of the separate auxiliary transformer primary windings for a time equal to one of 120° and 240° of a single cycle of the three phase source of electrical energy.

25. High speed resistance seam welding structure comprising a source of three phase electrical energy, an auxiliary transformer having three separate primary windings, means connecting each of the auxiliary transformer primary windings across a separate phase of the three phase source of electrical energy, a single auxiliary transformer secondary winding connected directly to the seam welder structure and separate phase control means in each auxiliary transformer primary winding for controlling the energizing of the associated transformer primary winding from an associated phase of the three phase source of welding energy to energize each primary winding of the auxiliary transformer at a different time and with only one phase of the primary winding being energized at any time for a full cycle and providing a predetermined time delay between energizing of the separate auxiliary transformer primary windings for a time equal to one of 120° and 240° of a single cycle of the three phase source of electrical energy.

26. In combination, a source of three phase electrical energy, high speed seam welding structure, a transformer with three primary windings connected to the three phases of the three phase source of electrical energy, means for energizing the seam welding structure from the transformer and means operably associated with the transformer for alternatively energizing one transformer primary winding at a time with a full cycle of one phase of the three phase source of electrical energy at a time and providing a time delay equal to one of 120° and 240° of the electrical energy in the three phase source of electrical energy between energizing of the separate primary windings of the transformer.

* * * * *